United States Patent [19]
Laney

[11] Patent Number: 5,236,062
[45] Date of Patent: Aug. 17, 1993

[54] ATV SUPPORT RACK APPARATUS

[76] Inventor: Roger C. Laney, 3335 Browndell Rd., Chatanooga, Tenn. 37419-2204

[21] Appl. No.: 835,516

[22] Filed: Feb. 14, 1992

[51] Int. Cl.$^5$ ............................................... E06C 5/00
[52] U.S. Cl. .................................. 182/127; 182/116; 182/21
[58] Field of Search ............... 182/127, 163, 104, 187, 182/21, 116, 20, 90, 91, 92; 224/42.45 R, 42.34, 42.01; 280/163, 166, 164.1

[56] References Cited

U.S. PATENT DOCUMENTS

| | | | |
|---|---|---|---|
| 680,402 | 8/1901 | Van Court | 182/20 X |
| 3,057,431 | 10/1962 | George | 182/116 |
| 4,614,252 | 9/1986 | Tarner | 182/127 X |
| 4,625,831 | 12/1986 | Rodgers, Jr. | 182/116 |
| 4,690,248 | 9/1987 | Killeen | 182/127 X |
| 4,787,477 | 11/1988 | Dolan | 182/127 X |
| 4,800,986 | 1/1989 | Hayes, III | 182/127 X |
| 4,911,264 | 3/1990 | McCafferty | 182/92 |
| 4,944,434 | 7/1990 | Hamilton | 224/42.45 R |
| 4,947,961 | 8/1990 | Dudley | 182/92 |
| 5,064,020 | 11/1991 | Eagleson | 182/116 X |

*Primary Examiner*—Karen J. Chotkowski
*Attorney, Agent, or Firm*—Leon Gilden

[57] ABSTRACT

A support rack arranged for mounting to an all-terrain vehicle framework is formed with a first frame assembly in confronting relationship to a second frame assembly defining a gap therebetween to receive various components for transport. The frame assembly includes a rectilinear framework to include fully projecting legs to receive projecting legs of the second frame assembly in an adjustable relationship. A modification of the invention includes the first frame assembly mounting a ladder structure thereto in a pivotal relationship for use in hunting situations when transporting components such as tree stands permitting ease of ascent of an associated tree utilizing the ladder arrangement.

1 Claim, 4 Drawing Sheets

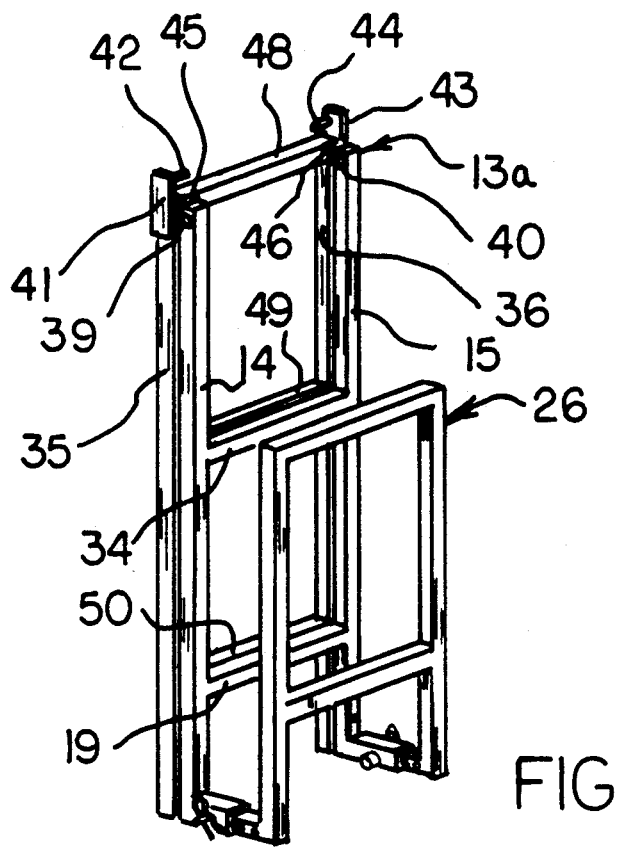
FIG 4
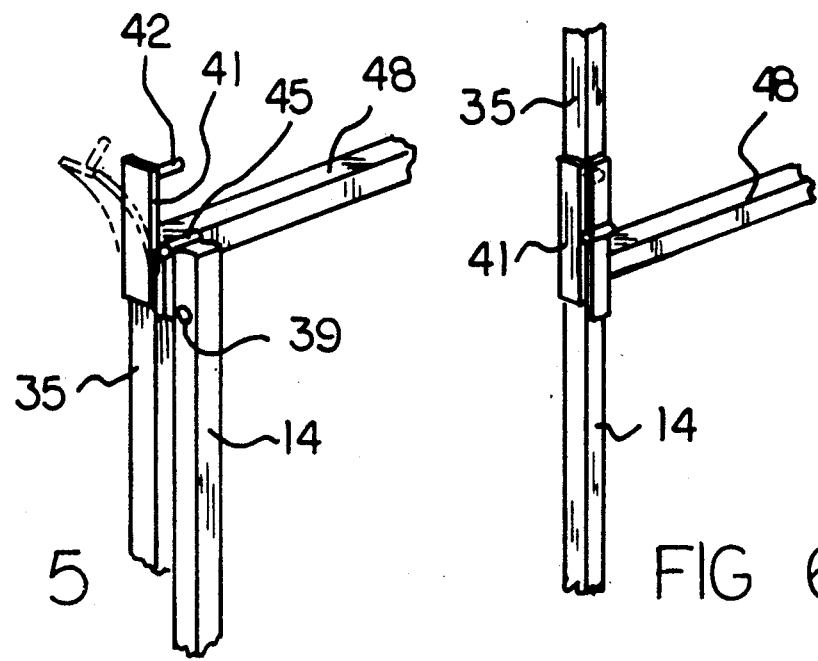
FIG 5
FIG 6

ATV SUPPORT RACK APPARATUS

BACKGROUND OF THE INVENTION

1. Field of the Invention

The field of invention relates to all-terrain vehicle apparatus, and more particularly pertains to a new and improved ATV support rack apparatus wherein the same is arranged to provide for transport of various components relative to the all-terrain vehicle to particularly include tree stand structure.

2. Description of the Prior Art

All-terrain vehicle assemblies are available in the prior art and are utilized for access to remote areas in "off-road" travel.

Various tower structure is available in the prior art for mounting to all-terrain vehicles as exemplified in the U.S. Pat. No. 4,800,986 to Hayes wherein a tower is arranged in a collapsing manner relative to an all-terrain vehicle.

The U.S. Pat. No. 3,696,374 to Hale sets forth an all-terrain vehicle with a hunting stand mounted fixedly to the hunting vehicle.

U S. Pat. Nos. 4,730,699; 4,592,446; and 4,782,918 are examples of collapsing tree stands as may be transported by the instant invention in use.

Accordingly, it may be appreciated that there continues to be a need for a new and improved ATV support rack apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of all-terrain vehicle apparatus now present in the prior art, the present invention provides an ATV support rack apparatus wherein the same is arranged for the ease of transport of tree stands and the like mounted to an all-terrain vehicle. As such, the general purpose of the present invention, which will be described subsequently in greater detail, is to provide a new and improved ATV support rack apparatus which has all the advantages of the prior art all-terrain vehicle apparatus and none of the disadvantages.

To attain this, the present invention provides a support rack arranged for mounting to an all-terrain vehicle framework formed with a first frame assembly in confronting relationship to a second frame assembly defining a gap therebetween to receive various components for transport. The frame assembly includes a rectilinear framework to include fully projecting legs to receive projecting legs of the second frame invention includes the first frame assembly mounting a ladder structure thereto in a pivotal relationship for use in hunting situations when transporting components such as tree stands permitting ease of ascent of an associated tree utilizing the ladder arrangement.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ATV support rack apparatus which has all the advantages of the prior art all-terrain vehicle apparatus and none of the disadvantages.

It is another object of the present invention to provide a new and improved ATV support rack apparatus which may be easily and efficiently manufactured and marketed.

It is a further object of the present invention to provide a new and improved ATV support rack apparatus which is of a durable and reliable construction.

An even further object of the present invention is to provide a new and improved ATV support rack apparatus which is susceptible of a low cost of manufacture with regard to both materials and labor, and which accordingly is then susceptible of low prices of sale to the consuming public, thereby making such ATV support rack apparatus economically available to the buying public.

Still yet another object of the present invention is to provide a new and improved ATV support rack apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of a modified rack structure of the invention.

FIG. 5 is an isometric illustration of section 5, as set forth in FIG. 4.

FIG. 6 is an isometric illustration of the modified rack structure in an erected configuration.

DESCRIPTION OF THE PREFERRED EMBODIMENT

Figure 1:
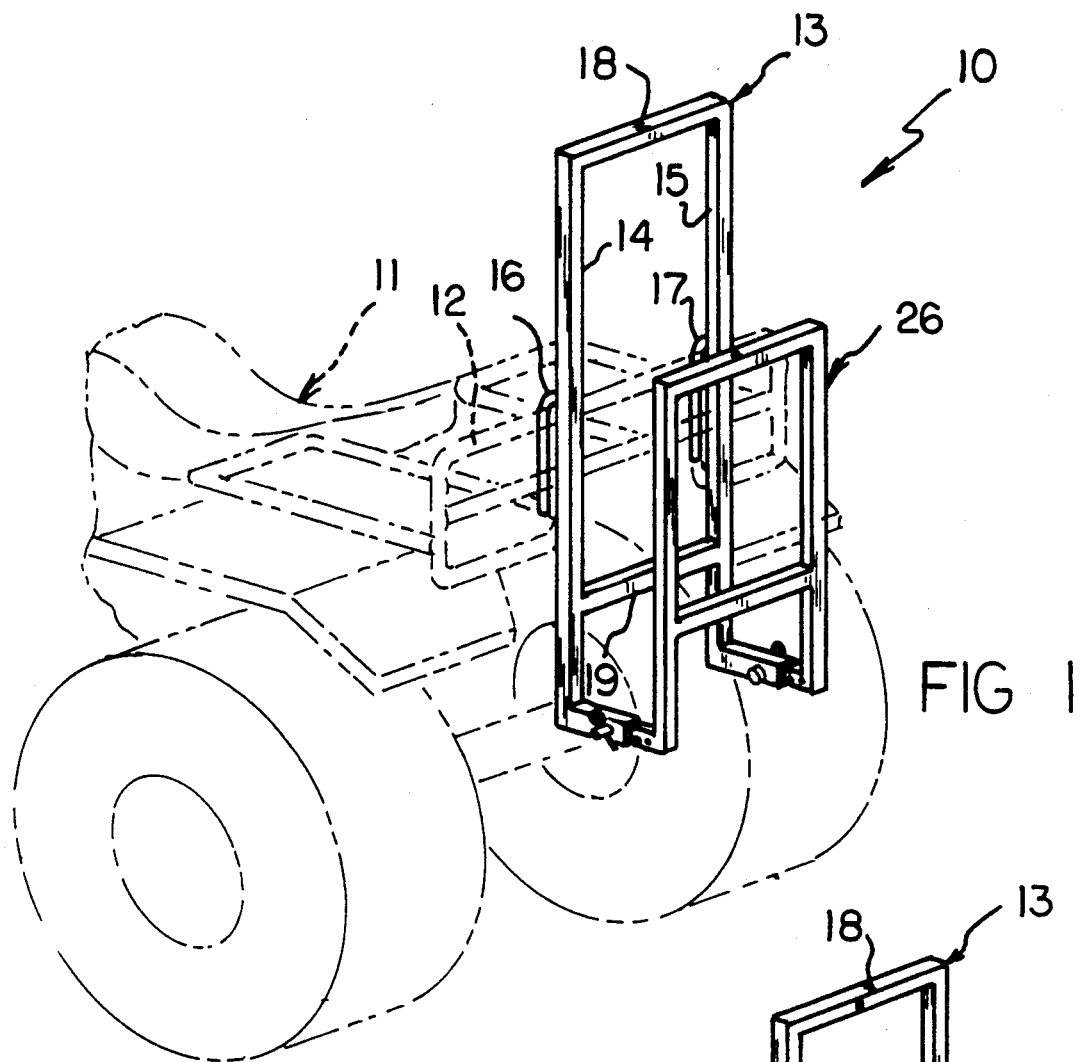
FIG. 1 is an isometric illustration of the instant invention mounted to an all-terrain vehicle.
Figure 2:
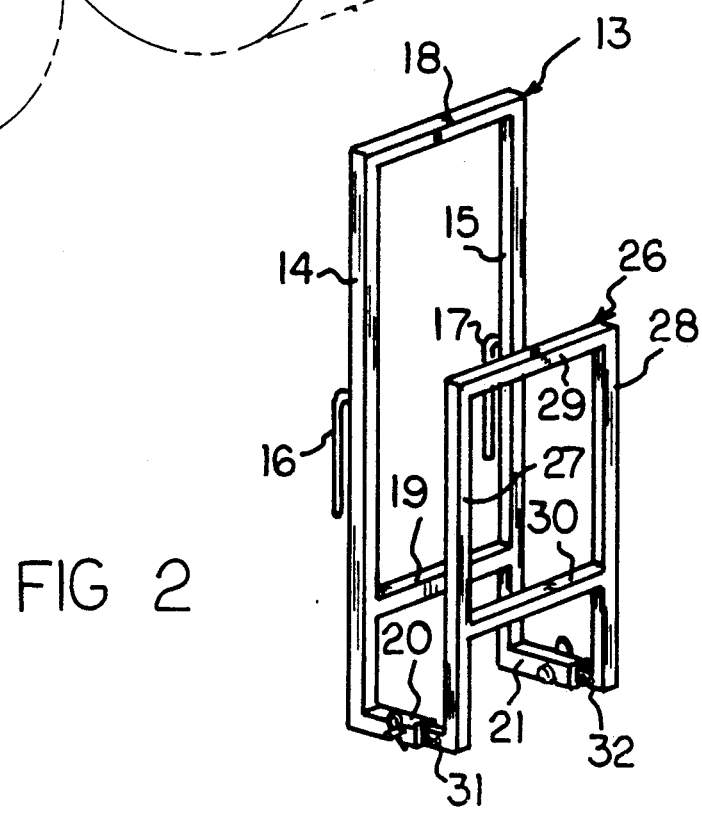
FIG. 2 is an isometric illustration of the rack structure of the invention.
Figure 3:
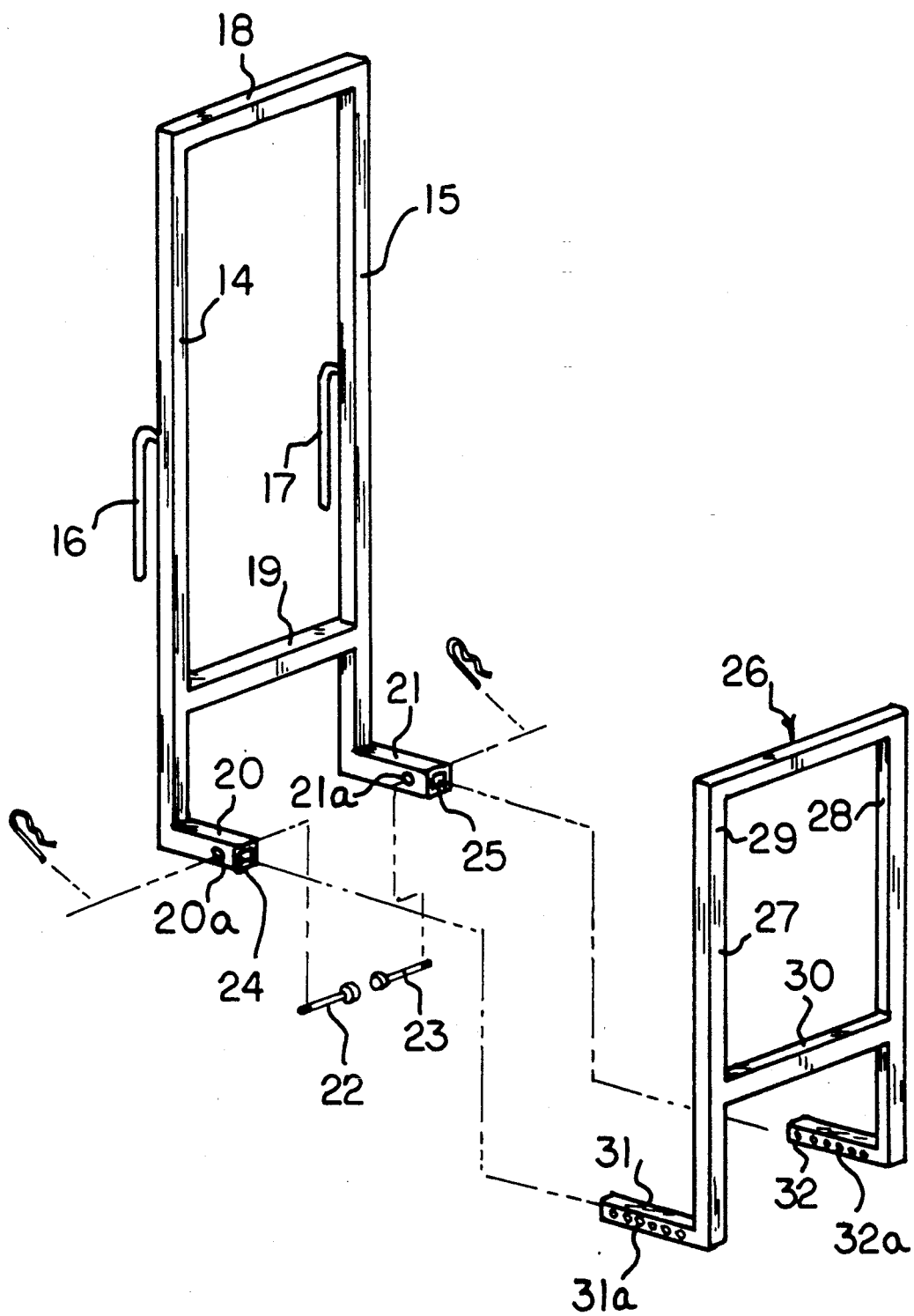
FIG. 3 is an isometric exploded illustration of the rack structure of the invention.

With reference now to the drawings, and in particular to FIGS. 1 to 7 thereof, a new and improved ATV support rack apparatus embodying the principles and concepts of the present invention and generally designated by the reference numeral 10 will be described.

More specifically, the ATV support rack apparatus 10 of the instant invention essentially comprises a first frame assembly 13 in adjustment relative to a second frame assembly 26 to define a gap therebetween, as the second frame assembly is slidably mounted relative to the first frame assembly, in a manner to be discussed in more detail below, to secure various components within the gap, such as a tree stand (not shown) of a type set forth in the prior art for use in a sportsmen type event such as hunting. The first frame assembly 13 includes respective first and second vertical legs 14 and 15 arranged in a parallel coextensive relationship. A first L-shaped support leg 16 is mounted medially of the first vertical leg 14 to a rear surface thereof arranged in a parallel and coextensive relationship relative to a second L-shaped support leg 17 mounted to a rear surface of the second vertical leg 15. The first and second L-shaped support legs 16 and 17 are arranged to receive an all-terrain vehicle horizontal frame member 12 of an associated all-terrain vehicle 11, in a manner as illustrated in FIG. 1, for ease of positioning and mounting of the apparatus to the all-terrain vehicle. A first projecting tube 20 and a second projecting tube 21 project orthogonally and forwardly of the first and second vertical legs 14 and 15 at their lower distal ends, wherein the first and second projecting tubes 20 and 21 are arranged in a parallel coextensive relationship and include respective first and second projecting tube bores 20a and 21a (see FIG. 3) that receive respective first and second lock pins 22 and 23 that are directed through the first and second projecting tube bores 20a and 21a, as well as the third and fourth legs 31 and 32 that are formed with respective third leg apertures and fourth leg apertures 31a and 32a respectively. The third and fourth legs 31 and 32 of the second frame assembly 26 are arranged in a parallel relationship spaced apart a predetermined spacing substantially equal to the predetermined spacing defined between the first and second projecting tubes 20 and 21 that are formed with respective first and second tube cavities 24 and 25. The third and fourth leg apertures 31a and 32a are spaced apart in an elongate row to provide adjustment and accordingly a spacing of the second frame assembly 26 relative to the first frame assembly 13. The second frame assembly 26 includes a second frame first leg 27 and a second frame second leg 28 arranged in a parallel coextensive relationship and orthogonally mounted at their lower distal ends to the respective second frame third and fourth legs 31 and 32. A second frame first connecting leg 29 and a second frame second connecting leg 30 orthogonally intersect the second frame first and second legs 27 and 28 to provide for a rectilinear rigid framework in the second frame assembly 26. Similarly, a first connecting leg 18 and a second connecting leg 19 of the first frame assembly orthogonally intersect the first frame first and second vertical legs 14 and 15, with the first connecting leg 18 mounted at an upper distal end of the first and second vertical legs 14 and 15, with the second connecting leg positioned below the first and second L-shaped support legs 16 and 17 and above the first and second projecting tubes 20 and 21.

Figure 7:
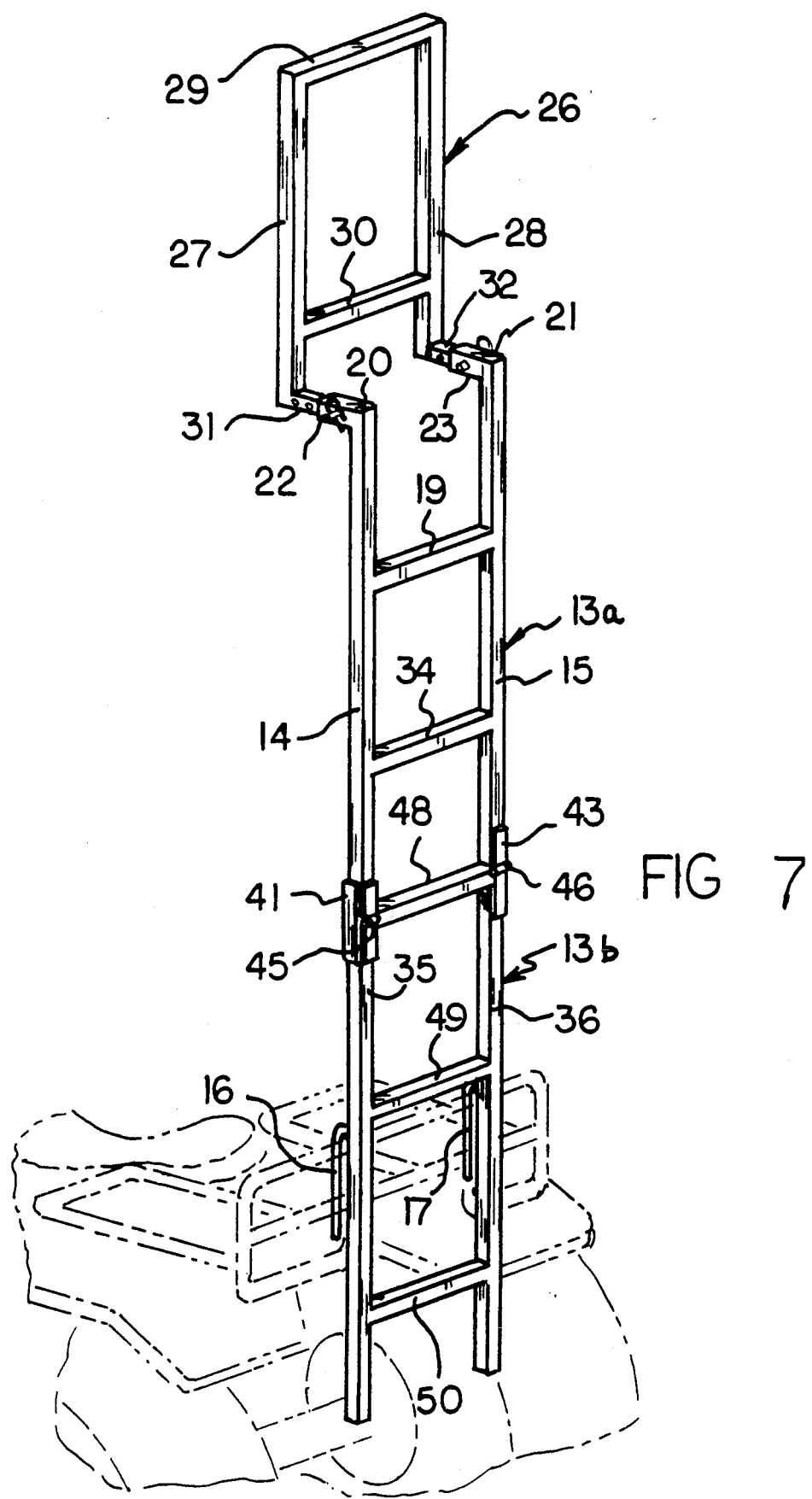
FIG. 7 is an isometric illustration of the modified rack structure in use with an associated all-terrain vehicle.

A modified first frame assembly 13a is illustrated in the FIGS. 4–7 and connected to a base assembly 13b. The modified first frame assembly 13a includes a first assembly intermediate first leg 34 positioned below the upper distal ends of the first and second vertical legs 14 and 15 and above the second connecting leg 19, with the first assembly intermediate first leg 34 spaced apart a predetermined spacing relative to the second connecting leg 19 in lieu of the first connecting leg 18. First assembly first leg 35 and a base assembly second leg 36 arranged in a parallel coextensive relationship relative to one another mount the respective first and second L-shaped support legs 16 and 17 to rear surfaces of the respective base first and second legs 35 and 36 for reception of the ATV horizontal frame members 12, in a manner as illustrated in FIG. 7. The first and second vertical legs 14 and 15 include respective first and second vertical leg bores 39 and 40 orthogonally projected through the first and second vertical legs 14 and 15 adjacent upper distal ends of the respective first and second vertical legs, with the first and second vertical leg bores 39 and 40 coaxially aligned relative to one another and parallel relative to the first assembly intermediate first leg 34 and the second connecting leg 19. A resilient first latch plate 41 mounting a first latch plate pin 42 is mounted to an upper distal end of the base assembly first leg 35 projecting thereabove, with a base assembly second leg 36 including a resilient second latch plate 43 mounting a second latch plate pin 44. The pins 42 and 44 are coaxially aligned, whereupon pivotment of the base assembly 13b to a longitudinally aligned relationship relative to the modified first frame assembly 13a permits reception of the first latch plate pin 42 within the first vertical leg bore 39 and the second latch plate pin 44 within the second vertical leg bore 40 to fixedly secure the modified first frame assembly 13a to the base assembly 13b. First and second hinges 45 and 46 hingedly mount the upper distal ends of the base assemblies first and second legs 35 and 36 to the respective upper distal ends of the first and second vertical legs 14 and 15. Respective third, fourth, and fifth connecting legs 48, 49, and 50 are orthogonally and integrally directed between the base assembly's first and second legs 35 and 36, with the third connecting leg 48 directed between the upper distal ends in an orthogonal relationship of the base first and second legs 35 and 36, and the fourth and fifth connecting legs 49 and 50 spaced from the third connecting leg 48 orthogonally directed between the base first and second legs 35 and 36. It should be noted that in the second position, as illustrated in FIG. 7, from the first position, as illustrated in FIG. 4, the first assembly intermediate first leg 34, the second connecting leg 19, the third connecting leg 48, the fourth connecting leg 49, and the fifth connecting leg 50 are spaced apart a predetermined spacing relative to one another. In this manner, an extension ladder is erected in the second position, as illustrated in FIG. 7, from the first position, as illustrated in FIG. 4, to convert the organization from a support rack structure to an extension ladder permitting access to a tree and the like (not shown) for positioning of a tree stand therewithin. In this manner, the versatility of the organization for use as a ladder structure in addition to a transport rack in the absence of such conveniences in remote geographical areas expedites use of tree stands and the like in a sporting event such as hunting.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An ATV support rack apparatus arranged for securement to an all-terrain vehicle, with the all-terrain vehicle including an all-terrain vehicle horizontal frame member, wherein the apparatus comprises, a first frame assembly adjustably mounted relative to a second frame assembly, the first frame assembly including a first vertical leg spaced, from, parallel to, and coextensive with a second vertical leg, and a first connecting leg orthogonally and integrally mounted between the first vertical leg and the second vertical leg, with the first connecting leg spaced below an upper distal end of the first vertical leg and the second vertical leg, and a second connecting leg spaced below the first connecting leg, with the second connecting leg integrally and orthogonally mounted between the first vertical leg and the second vertical leg, with the second connecting leg spaced from the first connecting leg a predetermined spacing, and a first projecting tube integrally and orthogonally mounted to a lower distal end of the first vertical leg and a second projecting tube integrally and orthogonally mounted to a lower distal end of the second vertical leg, wherein the first projecting tube and the second projecting tube are arranged in a parallel coextensive relationship relative to one another integrally and orthogonally mounted to the respective first and second vertical legs, and the second frame assembly including a second frame assembly first leg spaced from and parallel a second frame assembly second leg in a parallel coextensive relationship, and the second frame assembly first leg including a second fame assembly first connecting leg integrally and orthogonally mounted between the second frame assembly first leg and the second frame second leg, and a second frame assembly second connecting leg spaced from and parallel the second frame assembly first connecting leg, with the second frame assembly second connecting leg integrally and orthogonally mounted between the second frame assembly first leg and the second frame assembly second leg, with the second frame assembly first connecting leg and the second frame assembly second connecting leg spaced apart the predetermined spacing, and a second frame assembly third leg integrally and orthogonally mounted to a lower distal end of the second frame assembly first leg arranged for reception within the first projecting tube, and a second frame assembly fourth connecting leg integrally and orthogonally mounted to a lower distal end of the second frame assembly second leg slidably received within the second projecting tube, and a first lock means for adjustably mounting and securing the second frame assembly third leg within the first projecting tube, and second lock means for adjustably and fixedly securing the second frame assembly fourth leg within the second projecting tube to define a gap between the first frame assembly and the second frame assembly, wherein the second frame assembly first leg and the second frame assembly second leg are arranged in a spaced parallel adjacency to the first vertical leg and the second vertical leg respectively, and a base assembly, the base assembly including a base assembly first leg and a base assembly second leg arranged in a parallel coextensive relationship relative to one another, wherein the base assembly first leg includes a first leg first end and the base assembly second leg includes a second leg first end, wherein the first leg first end and the second leg first end includes a respective resilient first and second latch plate respectively mounted to the first leg first end an the second leg second end, and the first vertical leg includes a first vertical ore and the second vertical leg includes a second vertical leg bore, wherein the first vertical ore and the second vertical bore are positioned adjacent the first leg first end and the second leg second end, and wherein the first latch plate includes a first latch plate pin and the second latch plate includes a second latch.plate pin, wherein the first latch plate pin is arranged for reception in the first vertical leg bore and the second latch plate pin is arranged for reception with the second vertical leg bore when the base assembly first leg and the base assembly second leg are pivoted in longitudinal alignment wit the respective first vertical leg and the second vertical leg, and a first hinge secured to the base assembly firs leg and the first vertical leg, and a second hinge mounted to the base assembly second leg and the second vertical leg to hingedly mounted the base assembly first leg to the first vertical leg and the base assembly second leg to the second vertical leg respectively,
and
the base assembly first leg includes a first L-shaped support leg mounted to a rear surface of the base assembly first leg and a second L-shaped support leg mounted to a rear surface of the base assembly second leg, wherein the first L-shaped support leg and the second L-shaped support leg receive the all-terrain vehicle horizontal frame member between the base assembly first leg and the first L-shaped support leg and the base assembly second leg and the second L-shaped support leg,
and
a third connecting leg, a fourth connecting leg, and a fifth connecting leg, each integrally and orthogonally mounted between the base assembly first leg and the base assembly second leg, with the third connecting leg, the fourth connecting leg, and the fifth connecting leg spaced apart relative to one another the predetermined spacing.

* * * * *